US009073497B2

(12) United States Patent
Ogawa et al.

(10) Patent No.: US 9,073,497 B2
(45) Date of Patent: Jul. 7, 2015

(54) POWER GENERATION CONTROL APPARATUS IN VEHICLE (75) Inventors: Yasufumi Ogawa, Chiyoda-ku (JP); Takeru Okabe, Chiyoda-ku (JP); Hideaki Tani, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 383 days.

(21) Appl. No.: 13/246,944

(22) Filed: Sep. 28, 2011

(65) Prior Publication Data
US 2012/0253572 A1 Oct. 4, 2012

(30) Foreign Application Priority Data

Mar. 29, 2011 (JP) ................... 2011-071662

(51) Int. Cl.
*B60W 20/00* (2006.01)
*B60R 16/033* (2006.01)
*H02J 7/14* (2006.01)

(52) U.S. Cl.
CPC .............. *B60R 16/033* (2013.01); *H02J 7/1446* (2013.01); *Y02T 10/7005* (2013.01); *Y02T 10/92* (2013.01)

(58) Field of Classification Search
CPC . B60R 16/033; H02J 7/1446; Y02T 10/7005; Y02T 10/92
USPC ............. 701/22; 180/65.285; 290/40 A, 40 C
See application file for complete search history.

(56) References Cited

U.S. PATENT DOCUMENTS 7,531,909 B2 * 5/2009 Maeda et al. ............... 290/40 C
2008/0093851 A1 4/2008 Maeda et al.

FOREIGN PATENT DOCUMENTS

| JP | 2002-135909 | A1 |   | 5/2002 |        |
|----|-------------|----|---|--------|--------|
| JP | 2003-052131 | A  |   | 2/2003 |        |
| JP | 2005-012971 | A  |   | 1/2005 |        |
| JP | 2005012971  | A  | * | 1/2005 | ............... H02P 9/04 |
| JP | 2008-109740 | A  |   | 5/2008 |        |
| JP | 2008-109740 | A1 |   | 5/2008 |        |

OTHER PUBLICATIONS

Japanese Office Action dated Feb. 5, 2013, issued in Japanese Patent Application No. 2011-071662.

* cited by examiner

*Primary Examiner* — John Q Nguyen
*Assistant Examiner* — Anshul Sood
(74) *Attorney, Agent, or Firm* — Sughrue Mion, PLLC; Richard C. Turner (57) ABSTRACT A power generation control apparatus in a vehicle includes: a power generator generating power when driven by an internal combustion engine; an electric storage apparatus charged by the power generator; a current sensor measuring a charge and discharge current value; an SOC computation portion estimating an SOC in the electric storage apparatus on the basis of the measured charge and discharge current; a generation voltage computation portion determining a generation voltage of the power generator so that the SOC in the electric storage apparatus becomes a target SOC; a target SOC computation portion setting the target SOC; and a generation cost computation portion calculating an amount of consumed fuel per unit generation output on the basis of an operating point of the internal combustion engine. The target SOC set by the target SOC computation portion is changed according to the calculated amount of consumed fuel per unit generation output.

5 Claims, 6 Drawing Sheets

FIG.2

FIG.3
FUEL CONSUMPTION RATE CHARACTERISTICS MAP

GENERATION COST MAP

POWER GENERATION CONTROL APPARATUS IN VEHICLE

BACKGROUND OF THE INVENTION

1. Field of the Invention

The present invention relates to a power generation control apparatus that controls an amount of power generation by a power generator incorporated in a vehicle.

2. Background Art

As is described in Patent Document 1, there is a method of controlling an amount of power generation by a power generator according to a battery condition, such as a battery voltage, a battery current, and a battery operating temperature, using a power generation control apparatus equipped with a detection portion detecting the battery condition and a regulator capable of controlling magnitude of a DC voltage generated by a vehicle power generator. According to this method in the related art, a battery state of charge (hereinafter, abbreviated to SOC) calculated on the basis of a current charged to and discharged from the battery is maintained at a target of constant SOC to reduce unnecessary power generation. Accordingly, fuel efficiency is improved while battery exhaustion is prevented.

Patent Document 2 uses a power generation control apparatus that controls the battery SOC to stay at the target SOC as in Patent Document 1. Herein, a maximum value of engine efficiency is computed for every engine speed. By changing the target SOC according to the maximum value of engine efficiency, an amount of power generation is increased in a segment where engine efficiency is high. Consequently, an amount of fuel used for power generation can be reduced.

Further, Patent Document 3 discloses an apparatus that measures an increased amount of fuel for generation of unit generation output (hereinafter, referred to as the generation cost) for every engine operating condition and saves in advance an engine operating range in which the generation cost becomes low. The generation cost becomes lower at an operating point at which the engine is operating under medium load at steady running and becomes higher at an operating point at which the engine is operating under low load at idle or low-speed running. At the time of power generation, an amount of fuel consumed for power generation is reduced by generating power when the engine driving condition falls within the saved operating range. Further, in order to maintain the battery SOC constant at a predetermined value, the power generation range is widened and an amount of power generation is increased in a case where the battery SOC is smaller than the predetermined value whereas the power generation range is narrowed and an amount of power generation is reduced in a case where the battery SOC is larger than the predetermined value. Owing to this configuration, it becomes possible to reduce the generation cost while preventing overcharge and overdischarge of the battery.

Patent Document 1: JP-A-2003-52131
Patent Document 2: Japanese Patent No. 4497150
Patent Document 3: Japanese Patent No. 4158615

The control apparatus of Patent Document 1 controls the battery SOC to be always maintained constant independently of the operating condition of the engine. Accordingly, for example, in a case where the vehicle runs in the city by repeating running under medium load at low generation cost (for example, steady running) and running under low load at high generation cost (for example, idle), it is necessary to generate the same amount of power both at an operating point of high generation cost and an operating point of low generation cost. Hence, this control apparatus has a problem that a large amount of fuel is consumed for power generation.

As is described in Patent Document 3, it is known that an operating point of high engine efficiency and an operating point of low generation cost do not fall on the same operating point. However, because the apparatus of Patent Document 2 sets the target SOC according to the engine efficiency, there is a problem that a large amount of fuel is used for power generation.

The control apparatus of Patent Document 3 determines an engine operating range and an amount of power generation to carry out power generation so as to maintain the battery SOC constant. Accordingly, in a case where the vehicle runs by repeating running under medium load at low generation cost and running under low load at high generation cost, power is generated more frequently during the running under low load at high generation cost. This control apparatus therefore has a problem that a large amount of fuel is consumed for power generation as a result.

SUMMARY OF THE INVENTION

The invention has been devised to solve the problems discussed above and has an object to provide a power generation control apparatus in a vehicle capable of reducing an amount of fuel for power generation.

A power generation control apparatus in a vehicle according to one aspect of the invention includes: a power generator that generates power when driven by an internal combustion engine; an electric storage apparatus that is charged by the power generator; a current measurement portion that measures a value of a current to be charged to and discharged from the electric storage apparatus; a state of charge computation portion that estimates a state of charge in the electric storage apparatus on the basis of the measured charge and discharge current; a generation voltage computation portion that determines a generation voltage of the power generator so that the state of charge in the electric storage apparatus becomes a target state of charge; a target state of charge computation portion that sets the target state of charge; and a generation cost computation portion that calculates an amount of consumed fuel per unit generation output on the basis of an operating point of the internal combustion engine. The target state of charge set by the target state of charge computation portion is changed according to the amount of consumed fuel per unit generation output calculated by the generation cost computation portion.

According to this configuration, for a vehicle that runs by repeating running under medium load at low generation cost and running under low load at high generation cost, it becomes possible to reduce an amount of fuel consumed for power generation without reducing a total amount of power generation by increasing an amount of power generation in a segment where the generation cost is low and reducing an amount of power generation in a segment where the generation cost is high.

The foregoing and other objects, features, aspects, and advantages of the present invention will become more apparent from the following detailed description of the present invention when taken conjunction with the accompanying drawings.

DESCRIPTION OF THE PREFERRED EMBODIMENT

First Embodiment

Figure 1:
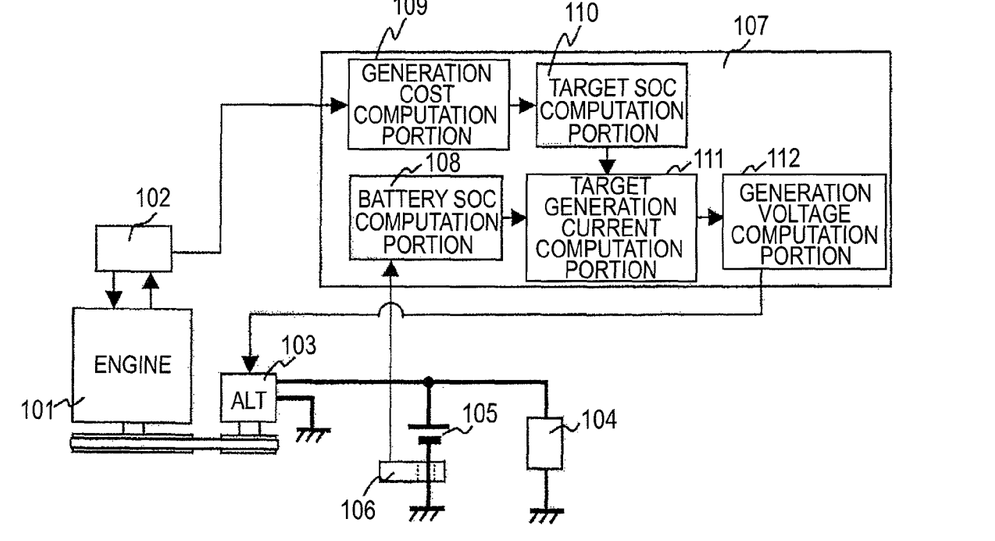
FIG. 1 is a block diagram showing a power generation control apparatus in a vehicle according to a first embodiment of the invention.

Hereinafter, one embodiment of the invention will be described on the basis of the drawings. Referring to FIG. 1, an engine 101 as a vehicle-driving internal combustion engine incorporated in a vehicle is controlled by an engine control apparatus 102. Rotative power of the engine 101 is transmitted to a power generator 103 via pulleys and a belt. The power generator 103 generates power and supplies a battery and a load with power. The power generator 103 is capable of changing a generation voltage according to a generation voltage command value from a power generation control apparatus 107. An electric load 104, such as an audio system and various controllers, incorporated in the vehicle is connected to an output end of the power generator 103. Power is supplied to the electric load 104 from the power generator 103 and a battery 105 described below. The battery 105 as an electric storage apparatus is connected to the output end of the power generator 103 to store power generated by the power generator 103 and supply the electric load 104 with power when necessary. A current sensor 106 as a current measuring instrument is attached to a minus terminal of the battery 105 to measure a value of a current charged to and discharged from the battery 105 and thereby provides measurement data to the power generation control apparatus 107.

The power generation control apparatus 107 determines the generation voltage command value for the power generator 103 on the basis of engine condition information (for example, engine speed and engine torque) received from the engine control apparatus 102 and the battery charge and discharge current received from the battery current sensor 106 and sends a command to the power generator 103. Herein, the power generation control apparatus 107 is provided separately from the engine control apparatus 102. It should be appreciated, however, that the power generation control apparatus 107 may be incorporated into another control apparatus, such as inside the engine control apparatus 102.

The power generation control apparatus 107 includes a battery SOC computation portion 108 that calculates a storage amount of the battery by integrating a value of the battery charge and discharge current measured by the battery current sensor 106, a generation cost computation portion 109 that calculates a generation cost from a power generation cost (an amount of consumed fuel per unit generation output) map calculated in advance using an efficiency map of the engine 101 and an efficiency map of the power generator 103, a target SOC computation portion 110 that determines a target SOC on the basis of the generation cost computed by the generation cost computation portion 109, a target generation current computation portion 111 that computes a value of a target generation current to be generated by the power generator 103 on the basis of the target SOC computed by the target SOC computation portion 110 and the SOC computed by the battery SOC computation portion 108, and a generation voltage computation portion 112 that determines a generation voltage so that a value of the current to be generated by the power generator 103 becomes the value of the target generation current computed by the target generation current computation portion 111. Herein, the battery SOC computation portion 108 is provided inside the power generation control apparatus 107. It should be appreciated, however, that the battery SOC computation portion 108 may be provided in the battery current sensor 106.

Figure 2:
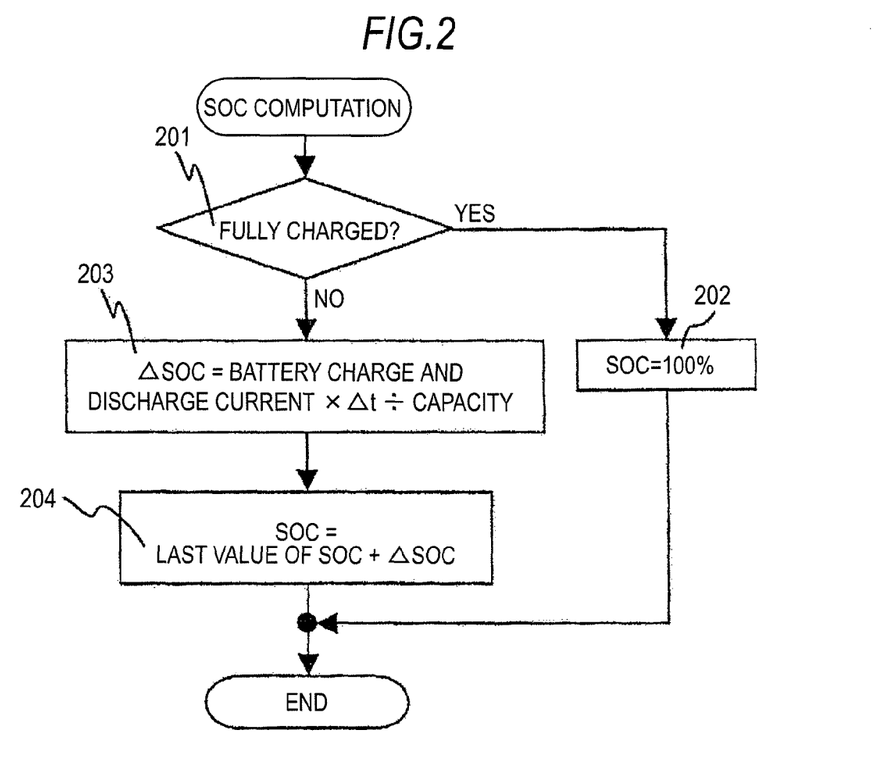
FIG. 2 is a flowchart depicting processing by a battery SOC computation portion of the first embodiment.

An operation of the power generation control apparatus 107 configured as above will now be described with reference to the drawings. FIG. 2 is a flowchart depicting processing by the battery SOC computation portion 108. This routine is carried out in a constant period, for example, 100 ms. In Step 201, whether the battery 105 is fully charged is determined. The condition of being fully charged is determined, for example, in a case where the battery charge and discharge current measured by the battery current sensor 106 is equal to or below a predetermined value when a generation voltage of the power generator 103 stays constant. The predetermined value used for this determination is determined on the basis of the characteristics of the battery 105 and may be changed according to a battery temperature. For example, by providing a mode in which the generation voltage of the power generator 103 is maintained constant after the engine 101 is initially started to wait for completion of the determination on the condition of being fully charged, it becomes possible to set an initial value of the SOC. In a case where the condition of being fully charged is determined in Step 201, the flow proceeds to Step 202.

In Step 202, the SOC is set to 100%. Herein, the SOC is set to 100%. It should be appreciated, however, that the SOC may be set to another value, for example, 99%, depending on the battery characteristics or temperature. In a case where the condition of being fully charged is not determined in Step 201, the flow proceeds to Step 203.

In Step 203, a variation of the battery SOC, $\Delta SOC$, is calculated on the basis of the battery charge and discharge current measured by the battery current sensor 106. The variation of the battery SOC, $\Delta SOC$, can be calculated on the basis of the battery charge and discharge current, the routine period $\Delta t$ (for example, 100 ms), and a capacity of the battery 105 by the following formula:

$$\Delta SOC = \text{battery charge and discharge current} \times \Delta t \div \text{battery capacity}.$$

By defining the sings of the battery charge and discharge current measured by the battery sensor 106 to be positive for discharging and negative for charging, it becomes possible to determine whether the battery SOC is increased or decreased.

After the variation of the SOC, ΔSOC, is calculated in Step 203, the flow proceeds to Step 204.

In Step 204, the SOC in this routine is calculated by adding the variation of the SOC calculated in Step 203 to the last value of SOC, which is the SOC calculated in the last routine. This routine ends when the SOC is calculated in Step 204.

Figure 3:
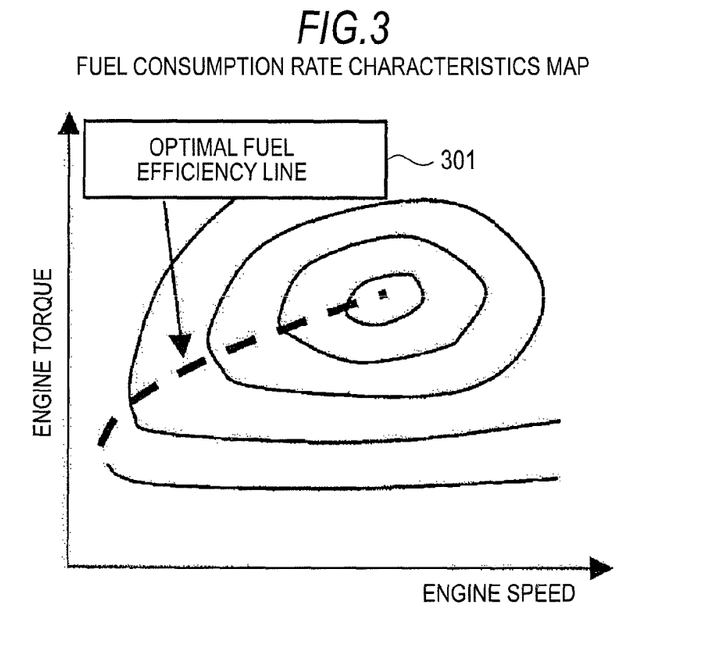
FIG. 3 is a fuel consumption rate characteristics map of an engine in the first embodiment.

FIG. 3 is a fuel consumption rate characteristics map of the engine 101. The map shows a fuel consumption rate (mL/kJ) according to an engine operating condition determined by the engine torque and the engine speed of the engine 101 and indicates that the fuel consumption rate becomes lower as the radius of circles in the drawing becomes smaller. The fuel consumption rate represents a fuel volume (mL) necessary for an engine to deliver a work of 1 kJ. In other words, it indicates efficiency of the engine 101 that the engine efficiency becomes higher as the fuel consumption rate becomes lower. Numeral 301 indicated by a broken line is an optimal fuel efficiency line and indicates points at which an amount of fuel becomes the minimum for the same output. Logically, it becomes possible to reduce an amount of consumed fuel by changing a transmission gear ratio by a transmission so that the engine 101 operates in accordance with the optimal fuel efficiency line 301.

Figure 4:
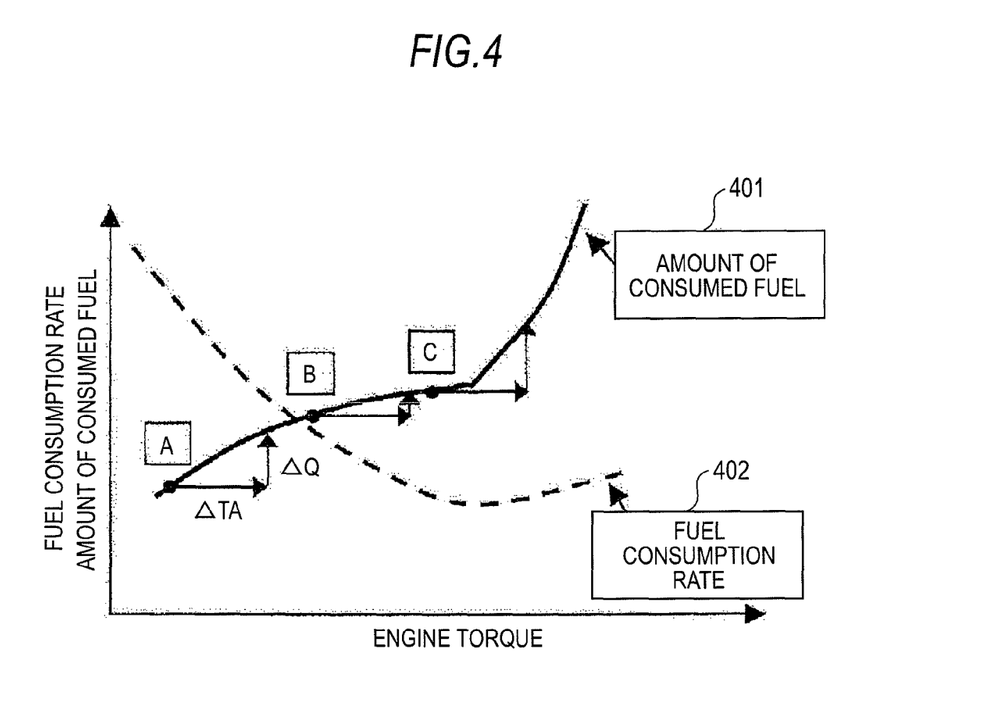
FIG. 4 is a view used to describe a generation cost using an amount of consumed fuel at a given rotation speed in the first embodiment.

FIG. 4 is a view used to describe a generation cost using an amount of consumed fuel (mL/s) at a given rotation speed. An amount of consumed fuel, 401, represents a fuel volume (mL) consumed per second and can be computed by multiplying a fuel consumption rate 402 and an engine output. The engine output is obtained by multiplying the engine torque and the engine speed. In FIG. 4, in a case where power is generated for the same generation output P at operating points A, B, and C, because the engine speed and an amount of power generation are the same, a power generation load torque ΔTA (indicated by horizontal arrows from the respective operating points A, B, and C) generated by the power generator 103 takes a constant value at any operating point. Meanwhile, an increase ΔQ of an amount of consumed fuel (indicated by vertical arrows from the tip end of the arrow representing ΔTA to a curve of the amount of consumed fuel, 401) in a case where the power generation load torque ΔTA is increased takes different values at the respective operating points. The generation cost D is expressed as follows using the generation output P and the fuel increase ΔQ: generation cost D=ΔQ/P. In other words, it can be described that the generation cost varies with an operating point at which power is generated. As is shown by the fuel increase ΔQ at the point C of FIG. 4, it can be described that an operating point at which the fuel consumption rate 402 is low, that is, an operating point at high engine efficiency is different from an operating point at low generation cost.

Figure 5:
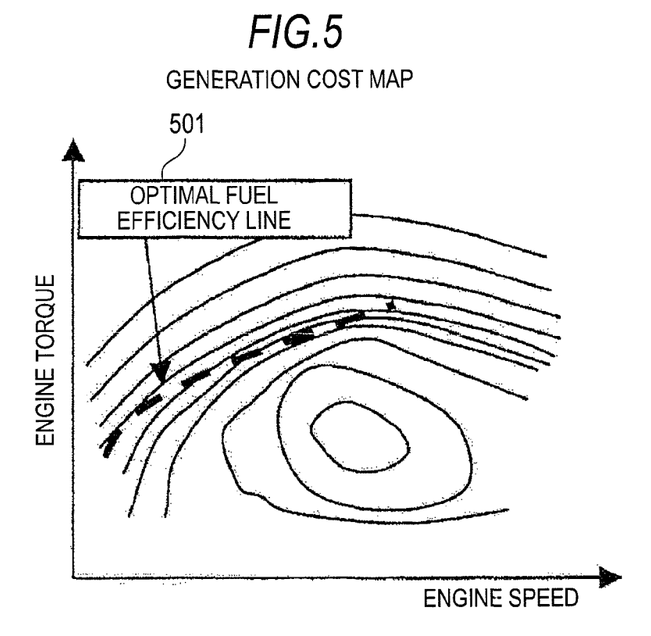
FIG. 5 is a view showing the generation cost corresponding to an engine torque and an engine speed of the engine in the first embodiment.

FIG. 5 is a map showing the generation cost corresponding to the engine torque and the engine speed of the engine 101. This map also indicates that the generation cost becomes lower as the radius of circles in the drawing becomes smaller. From the position of an optimal fuel efficiency line 501 (same as 301 in FIG. 3) and the position of the point at the minimum generation cost, it can be described that a point at the highest engine efficiency and a point at low generation cost are different. The generation cost becomes the minimum when the engine 101 is in a medium rotation range and a medium load range. In a case where power is generated in the engine operating mode as above, an amount of fuel increased for power generation is small.

Figure 6:
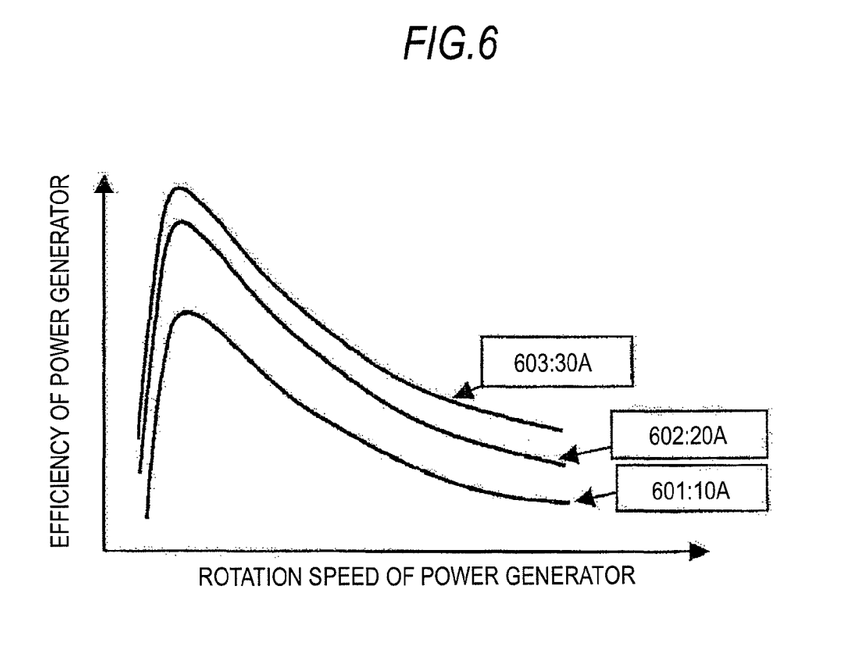
FIG. 6 is a view showing a relation of a rotation speed and generation efficiency of a power generator in a case where a generation voltage of the power generator is constant in the first embodiment.

FIG. 6 is a view showing a relation of a rotation speed and power generation efficiency of a power generator in a case where the generation voltage of the power generator 103 is constant. Numerals 601, 602, and 603 represent relations of the rotation speed and the power generation efficiency of a power generator in a case where a current value to be generated is changed. Generation currents for 601, 602, and 603 are in ascending order, for example, 10A, 20A, and 30A, respectively. In this manner, efficiency of the power generator 103 improves more as the generation current becomes larger.

Figure 7:
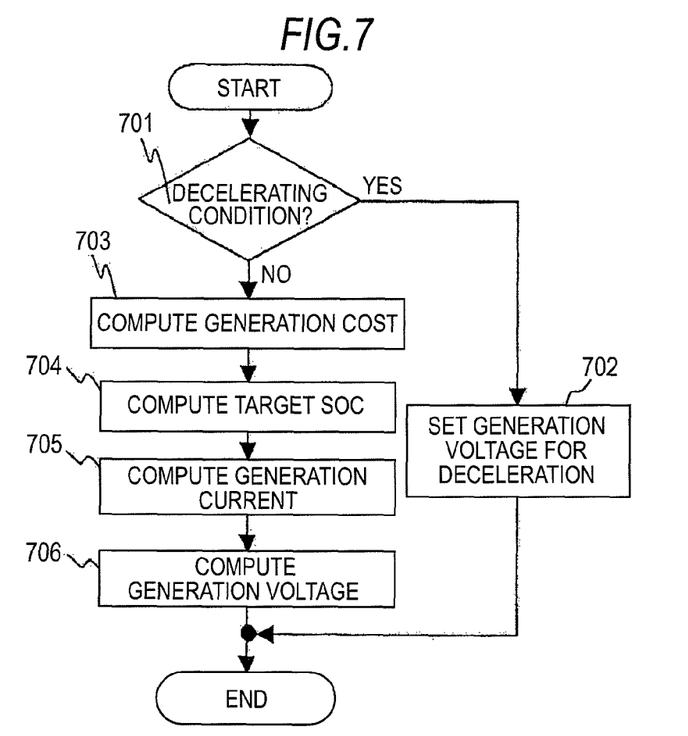
FIG. 7 is a flowchart depicting processing by the power generation control apparatus of the first embodiment.

FIG. 7 is a flowchart depicting processing by the power generation control apparatus 107 of this embodiment. This routine is to carry out the processing in a constant period, for example, 100 ms. In Step 701, the generation voltage computation portion 112 determines whether the vehicle is in a decelerating condition on the basis of vehicle information. Information on unillustrated vehicle speed sensor or accelerator position sensor is used as the vehicle information and the decelerating condition is determined, for example, in a case where the vehicle speed is 0 or higher and the accelerator is not pressed down. In a case where the decelerating condition is determined in Step 701, the flow proceeds to Step 702 and the step proceeds to Step 703 otherwise.

In Step 702, the generation voltage computation portion 112 changes the generation voltage of the power generator 103 to a set value for deceleration. The set value for deceleration is the largest possible value allowed by the battery 105 and the electric load 104.

In Step 703, the generation cost computation portion 109 computes the generation cost on the basis of the operating condition of the engine 101. The generation cost is found on the basis of the engine torque and the engine speed of the engine 101 using the generation cost map of FIG. 5. By computing the generation cost on the basis of the engine speed and the engine torque in this manner, the generation cost can be computed without having to provide a new sensor and hence without a cost increase.

In Step 704, the target SOC computation portion 110 computes the target SOC. The target SOC is determined according to the generation cost computed in Step 703. For example, the target SOC is determined using a relation of the generation cost and the target SOC shown in FIG. 10. By changing the target SOC according to the generation cost in this manner, it becomes possible to increase an amount of power generation at the intended generation cost. A power generation control apparatus with a small amount of fuel for power generation can be thus provided. Also, by setting the target SOC high when the generation cost is low and setting the target SOC low when the generation cost is high, it becomes possible to increase an amount of power generation in a segment where the generation cost is low. Consequently, a power generation control apparatus with a small amount of fuel for power generation can be provided.

In Step 705, the target generation current computation portion 111 computes a value of the target generation current of the power generator 103 on the basis of the target SOC computed in Step 704 and the SOC computed by the battery SOC computation portion 108.

In Step 706, the generation voltage computation portion 112 determines a generation voltage of the power generator 103 so that the target generation current computed in Step 705 is generated.

Figure 8:
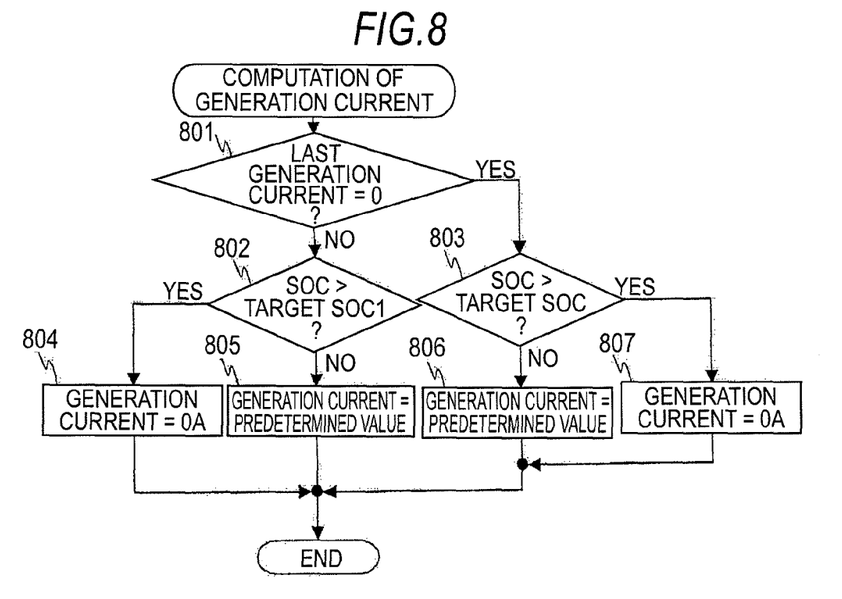
FIG. 8 is a flowchart depicting processing of a target generation current computation in the process of processing by the power generation control apparatus of the first embodiment.

FIG. 8 is a flowchart depicting the processing of the target generation current computation in Step 705 of FIG. 7, that is, the computation by the target generation current computation portion 111. In Step 801, whether a value of the last target generation current is 0 is determined. In a case where the last target generation current is 0, that is, in a case where power generation is not carried out, the flow proceeds to Step 803 and the flow proceeds to Step 802 otherwise.

In Step 802, a target SOC1 is calculated by adding a predetermined value to the target SOC computed by the target SOC computation portion 110. This predetermined value is to provide hysteresis to determination in Step 803 and determination in Step 802 and makes a setting not to repeat a condition in which power is generated and a condition in which no power is generated. By providing hysteresis to the computation method of the target generation current in this manner, it becomes possible to achieve a configuration such that prevents a condition in which power is generated and a condition in which no power is generated from being repeated in a short time. This consequently makes it possible to achieve a configuration preventing the power generation load from varying in a short time. It thus becomes possible to provide a power generation control apparatus that does not give uncomfortable feeling to the driver of the vehicle. Subsequently, the target SOC1 and the SOC computed by the battery SOC computation portion 108 are compared. In a case where the SOC is larger than the target SOC1, the flow proceeds to Step 804 and the flow proceeds to Step 805 otherwise. In Step 804, the target generation current is set to 0 to stop power generation.

In Step 805, a predetermined value is set to the target generation current. To this predetermined value is set a current making the generation efficiency high as is indicated by the characteristics of the power generator 103 of FIG. 6. By setting a current making the generation efficiency high in this manner, it becomes possible to reduce an increased amount of fuel for power generation. Consequently, a power generation control apparatus with a smaller fuel increase for power generation can be provided.

Meanwhile, in Step 803, the target SOC computed by the target SOC computation portion 110 and the battery SOC computed by the battery SOC computation portion 108 are compared. In a case where the SOC is larger than the target SOC, the flow proceeds to Step 807 and the flow proceeds to Step 806 otherwise. In Step 806, a predetermined value is set to the generation current as in the same manner as in Step 805. In Step 807, the target generation current is set to 0 to stop power generation.

Figure 9:
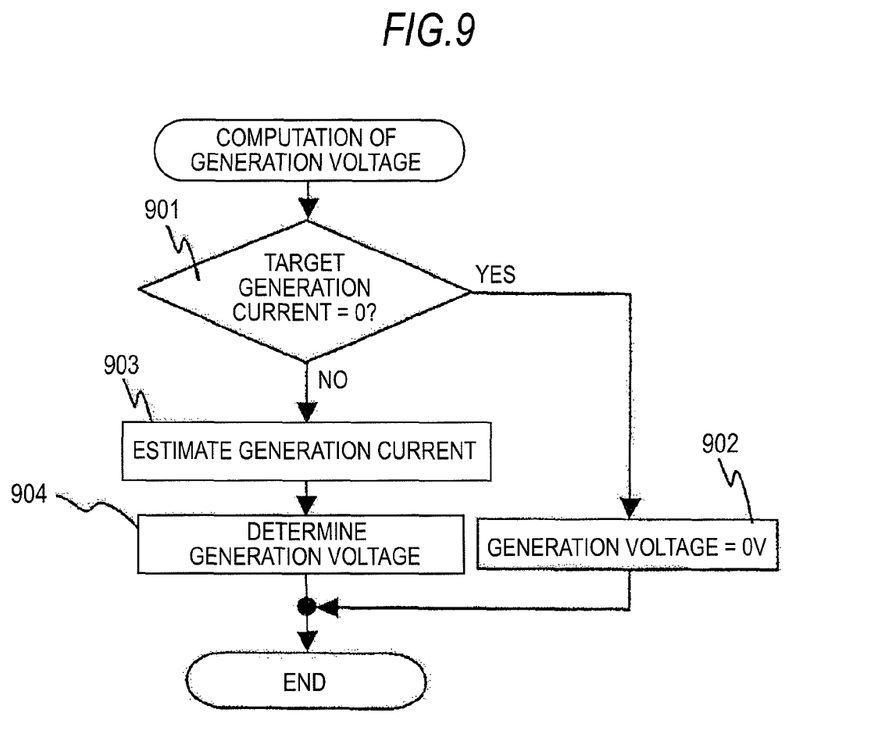
FIG. 9 is a flowchart depicting processing of a generation voltage computation in the process of processing by the power generation control apparatus of the first embodiment.

FIG. 9 is a flowchart depicting the processing of the generation voltage computation in Step 706 of FIG. 7, that is, a computation by the generation voltage computation portion 112. In Step 901, whether the target generation current computed by the target generation current computation portion 111 is 0 is determined. In a case where the target generation current is 0, power generation is deemed as being stopped and the flow proceeds to Step 902. Otherwise, the flow proceeds to Step 903. In Step 902, the generation voltage of the power generator 103 is set to 0 V to stop power generation.

In Step 903, the generation current is estimated on the basis of the characteristics of the power generator 103. The estimation method can be, for example, a computation on the basis of the rotation speed and a load factor of the power generator 103 using a map. The rotation speed of the power generator 103 can be computed by multiplying the engine speed of the engine 101 by a pulley ratio. The load factor of the power generator 103 can be obtained by the power generator 103 using an unillustrated communication wire.

In Step 904, PI control is carried out so that the generation current of the power generator 103 estimated in Step 903 coincides with the value of the target generation current computed by the target generation current computation portion 111 to determine the generation voltage.

Figure 10:
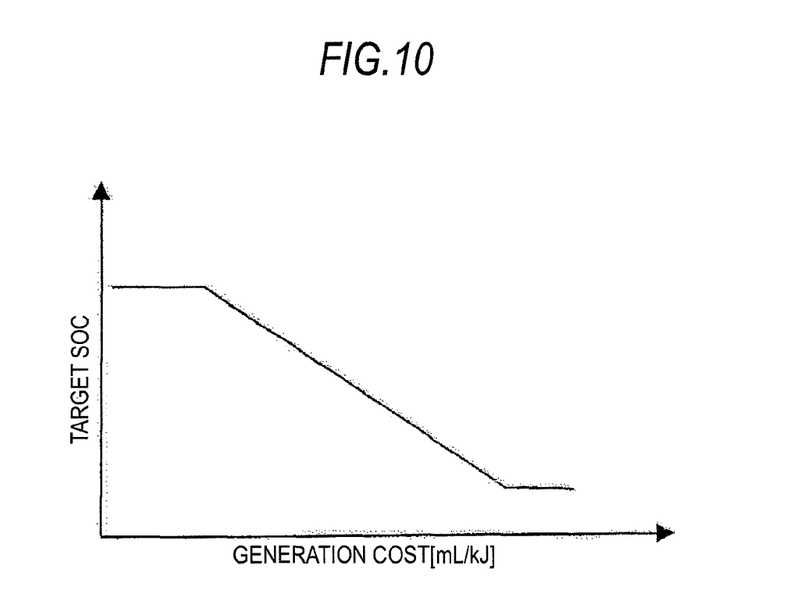
FIG. 10 is a view showing a relation of the generation cost and a target SOC in the first embodiment.

FIG. 10 is a view showing the relation of the generation cost and the target SOC. The target SOC computation portion 110 determines the target SOC using the relation of the generation cost and the target SOC. In FIG. 10, the relation of the generation cost and the target SOC is expressed by a linear function. It should be appreciated, however, that the expression is necessarily a linear function and control may be carried out using, for example, a binary expression according to the generation cost. Also, values allowed by the characteristics of the battery 105 are set to the minimum value and the maximum value of the target SOC.

Figure 11:
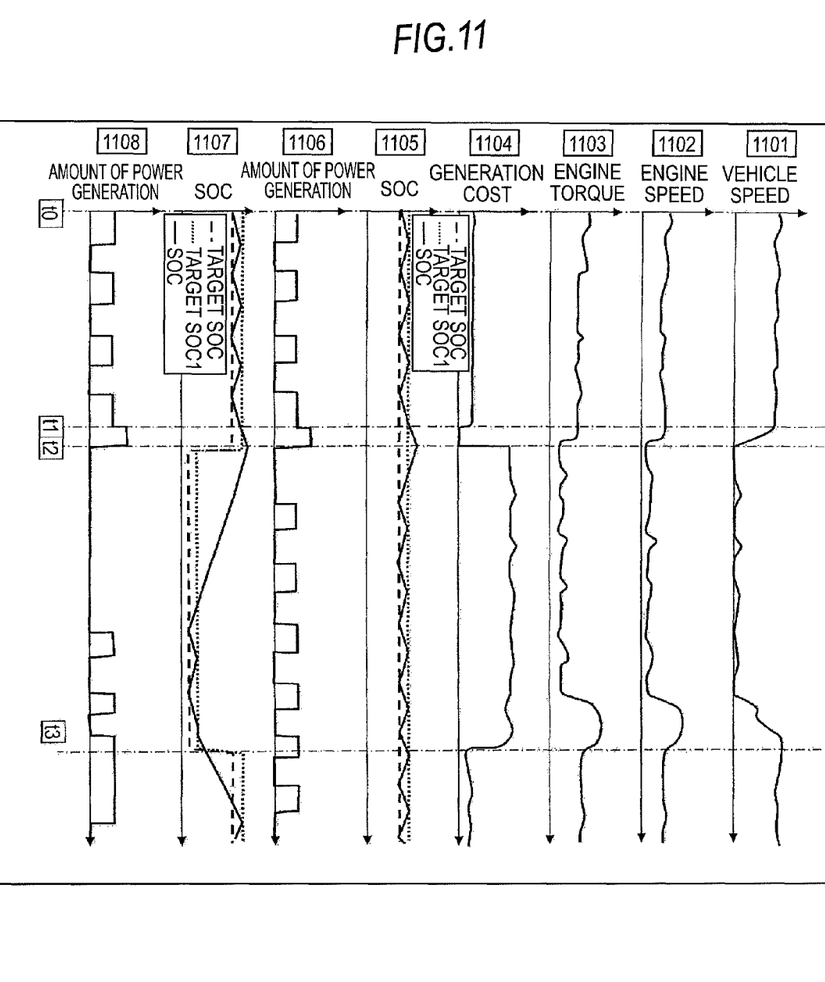
FIG. 11 is a time chart showing waveforms used to describe an operation of the first embodiment.

FIG. 11 is a time chart showing operating waveforms of this embodiment. A chart 1101 shows a vehicle speed. A chart 1102 shows the engine speed of the engine 101. A chart 1103 shows the engine torque of the engine 101. A chart 1104 shows the generation cost computed by the generation cost computation portion 109.

A chart 1105 shows the target SOC, the target SOC1, and the battery SOC in a case where the control in the related art, that is, the control to maintain the target SOC constant is carried out. A chart 1106 shows an amount of power generation by the power generator 103 in this instance.

A chart 1107 shows the target SOC, the target SOC1, and the battery SOC in a case where the power generation control apparatus of the invention is applied. A chart 1108 shows an amount of power generation under the control of this apparatus.

This time chart shows a case where the vehicle runs steadily at a medium vehicle speed at low generation cost from times t0 to t1 followed by deceleration from times t1 to t2 and runs alternately in an idling condition and a low-speed running condition at high generation cost from times t2 to t3. After a time t3, the vehicle runs again steadily at a medium vehicle speed at low generation cost.

A period from the times t0 to t1 is a steady running section at a medium vehicle speed at low generation cost. In this range, power is generated in such a manner that both of the SOC in the chart 1105 and the SOC in the chart 1107 are between the target SOC and the target SOC1 in accordance with the flowchart of FIG. 8. A period from the times t1 to t2 is a deceleration section in which the engine 101 does not eject fuel. Hence, because the generation cost is 0 in this section, power is generated in an amount increased to the extent allowed by the battery 105. In a period from the times t2 to t3, the vehicle runs under low load at idle or low-speed running at high generation cost.

In the chart 1105 under the control in the related art, power is not generated until the power stored during the deceleration section from times t1 to t2 is discharged and power is generated when the battery SOC becomes smaller than the target SOC. Thereafter, power is generated in accordance with the flowchart of FIG. 8.

On the contrary, the target SOC is set low for the SOC in the chart 1107 under the control of the invention because the generation cost is high. Accordingly, a time until the battery SOC becomes smaller than the target SOC, that is, a section during which no power is generated, can be set longer than the period set by the battery SOC of the chart 1105.

A period after the time t3 is a steady running section in which the vehicle runs at a medium vehicle speed at low generation cost. In the charts 1105 and 1106 under the control in the related art, power is generated according to the target SOC. In contrast, in the charts 1107 and 1108 under the power generation control of the invention, the target SOC is set high because the generation cost becomes lower. Accordingly, power generation is continued until the SOC reaches the target SOC.

As has been described above, in a case where the power generation control of the invention is carried out, by reducing an amount of power generation in a section where the generation cost is high and generating power in a section where the generation cost is low, it becomes possible to reduce an amount of fuel consumed for power generation when generating the same amount of power.

In the embodiment above, the control is carried out by computing the generation cost online on the basis of the engine operating condition and computing the target SOC later on the basis of the generation cost. It should be appreciated, however, that the invention is not necessarily configured in this manner. For example, it may be configured in such a manner that the generation cost is obtained off-line in advance on the basis of the respective engine operating conditions, so that the target SOC is set directly on the basis of the engine condition for the target SOC to become larger in a segment where the generation cost is low by the online processing.

Various modifications and alterations of this invention will be apparent to those skilled in the art without departing from the scope and spirit of this invention, and it should be understood that this is not limited to the illustrative embodiments set forth herein.

What is claimed is:

1. A power generation control apparatus in a vehicle, comprising:
   a power generator that generates power when driven by an internal combustion engine;
   an electric storage apparatus that is charged by the power generator;
   a current measurement portion that measures a value of a current to be charged to and discharged from the electric storage apparatus;
   a state of charge computation portion that estimates a state of charge in the electric storage apparatus on the basis of the measured charge and discharge current;
   a generation voltage computation portion that determines a generation voltage of the power generator so that the state of charge in the electric storage apparatus becomes a target state of charge;
   a target state of charge computation portion that sets the target state of charge; and
   a generation cost computation portion that calculates an amount of consumed fuel per unit generation output on the basis of an operating point of the internal combustion engine,
   wherein the target state of charge set by the target state of charge computation portion is set independently from the state of charge estimated by the state of charge computation portion and changed according to the amount of consumed fuel per unit generation output calculated by the generation cost computation portion, and
   wherein the amount of consumed fuel per unit generation output is equal to a fuel increase $\Delta Q$ divided by a generation output P, the generation output P being obtained by multiplying engine torque and engine speed of the internal combustion engine.

2. The power generation control apparatus in a vehicle according to claim 1, wherein
   in a case where the amount of consumed fuel per unit generation output calculated by the generation cost computation portion is large, the target state of charge set by the target state of charge computation portion is set lower than in a case where the amount of consumed fuel per unit generation output is small, and in a case where the amount of consumed fuel per unit generation output is small, the target state of charge set by the target state of charge computation portion is set higher than in a case where the amount of consumed fuel per unit generation output is large.

3. The power generation control apparatus in a vehicle according to claim 1, wherein
   the generation cost computation portion calculates the amount of consumed fuel per unit generation output on the basis of a rotation speed and the engine torque of the internal combustion engine.

4. The power generation control apparatus in a vehicle according to claim 1, wherein the generation voltage computation portion compares the state of charge in the electric storage apparatus with the target state of charge and determines a generation voltage to reach a generation current value which makes efficiency of the power generator highest in a case where the state of charge is smaller than the target state of charge and sets the generation voltage to be equal to or lower than a voltage of the electric storage apparatus in a case where the state of charge is larger than the target state of charge.

5. The power generation control apparatus in a vehicle according to claim 4, wherein
   in a case where the state of charge in the electric storage apparatus and the target state of charge are compared, hysteresis is provided to the target state of charge.

* * * * *